United States Patent [19]

Arnaud, deceased et al.

[11] 4,354,732

[45] Oct. 19, 1982

[54] CABLE ELEMENTS COMPRISING OPTICAL FIBRES AND CABLES INCORPORATING THEM

[75] Inventors: Maurice Arnaud, deceased, late of Paris, France; by Marie C. N. A. Avril nee Arnaud, heir, Quebec, Canada; by Michel F. Arnaud, heir, Saint-Pardoux, France; Bernard Chiron, Paris, France; Claude Gallachi, Paris, France; Jean-Pierre Hulin, Paris, France; Michel de Vecchis, Paris, France

[73] Assignee: Societe Lignes Telegraphiques et Telephoniques, Paris, France

[21] Appl. No.: 18,269

[22] Filed: Mar. 7, 1979

[30] Foreign Application Priority Data

Mar. 8, 1978 [FR] France .................. 78 06598

[51] Int. Cl.³ .............................................. G02B 5/14
[52] U.S. Cl. ................................................. 350/96.23
[58] Field of Search ..................................... 350/96.23

[56] References Cited

U.S. PATENT DOCUMENTS

| | | | |
|---|---|---|---|
| 3,887,265 | 6/1975 | Margolis et al. | 350/96.23 |
| 4,166,670 | 9/1979 | Ramsay | 350/96.23 |
| 4,199,224 | 4/1980 | Oestreich | 350/96.23 |
| 4,235,511 | 11/1980 | Yonechi | 350/96.23 |

FOREIGN PATENT DOCUMENTS

| | | | |
|---|---|---|---|
| 2507648 | 9/1976 | Fed. Rep. of Germany | 350/96.23 |
| 2509547 | 9/1976 | Fed. Rep. of Germany | 350/96.23 |
| 2511019 | 9/1976 | Fed. Rep. of Germany | 350/96.23 |
| 2519050 | 11/1976 | Fed. Rep. of Germany | 350/96.23 |
| 2312788 | 12/1976 | France | 350/96.23 |

*Primary Examiner*—John D. Lee
*Attorney, Agent, or Firm*—Robert A. Ostmann

[57] ABSTRACT

A transmission cable using optical fibre for conveying the information consists of fibres loosely laid in helical grooves of a core so that the fibre will undulate within the groove due to over-length given by pretwisting of the fibre and curvature of the groove flanks. Reduction of the contact surface between the fibre and the core improves the electrical characteristics and reduces the sensitivity of the cable to mechanical stress.

5 Claims, 8 Drawing Figures

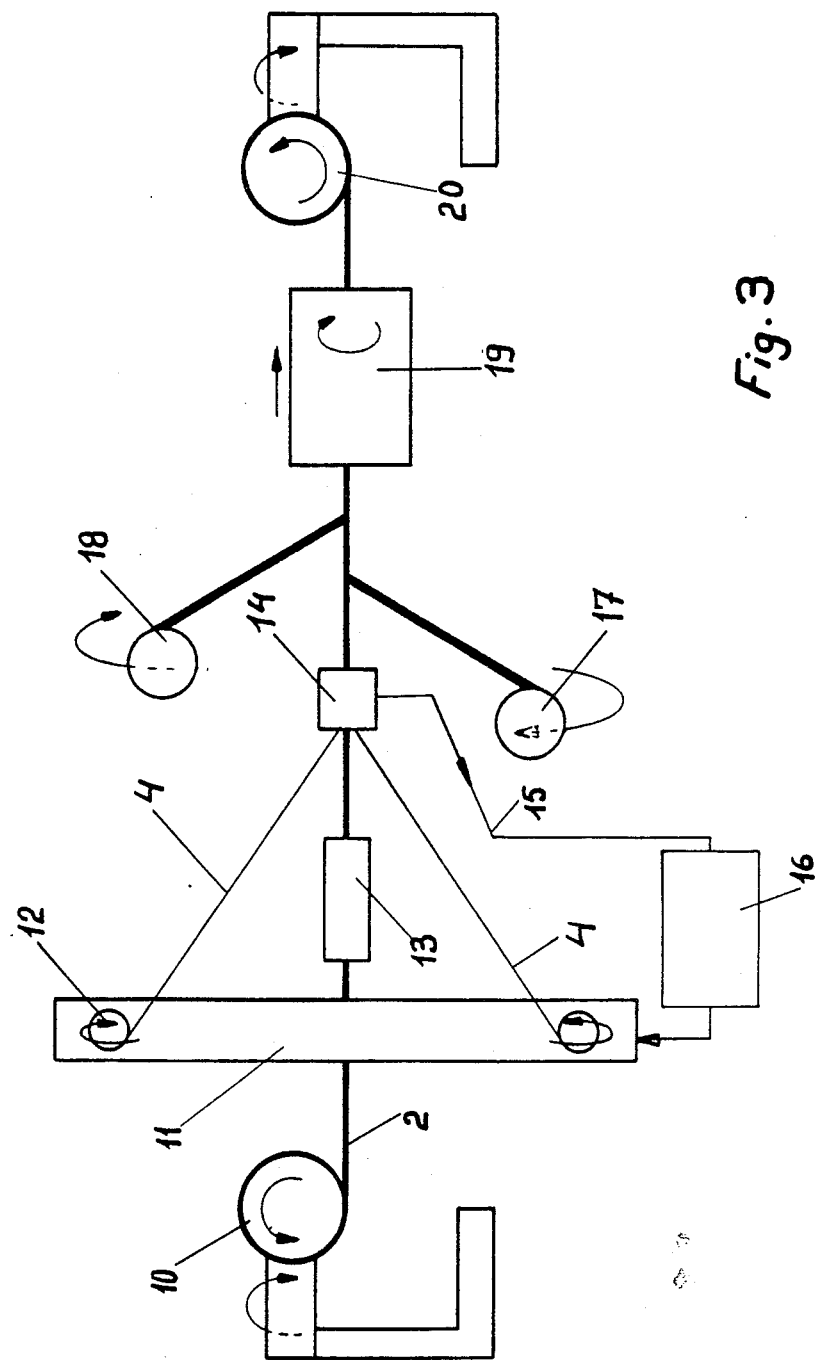

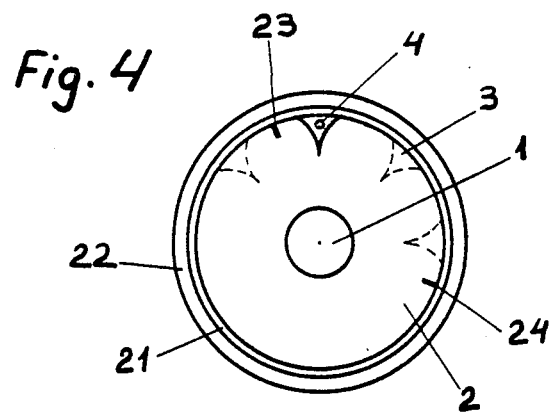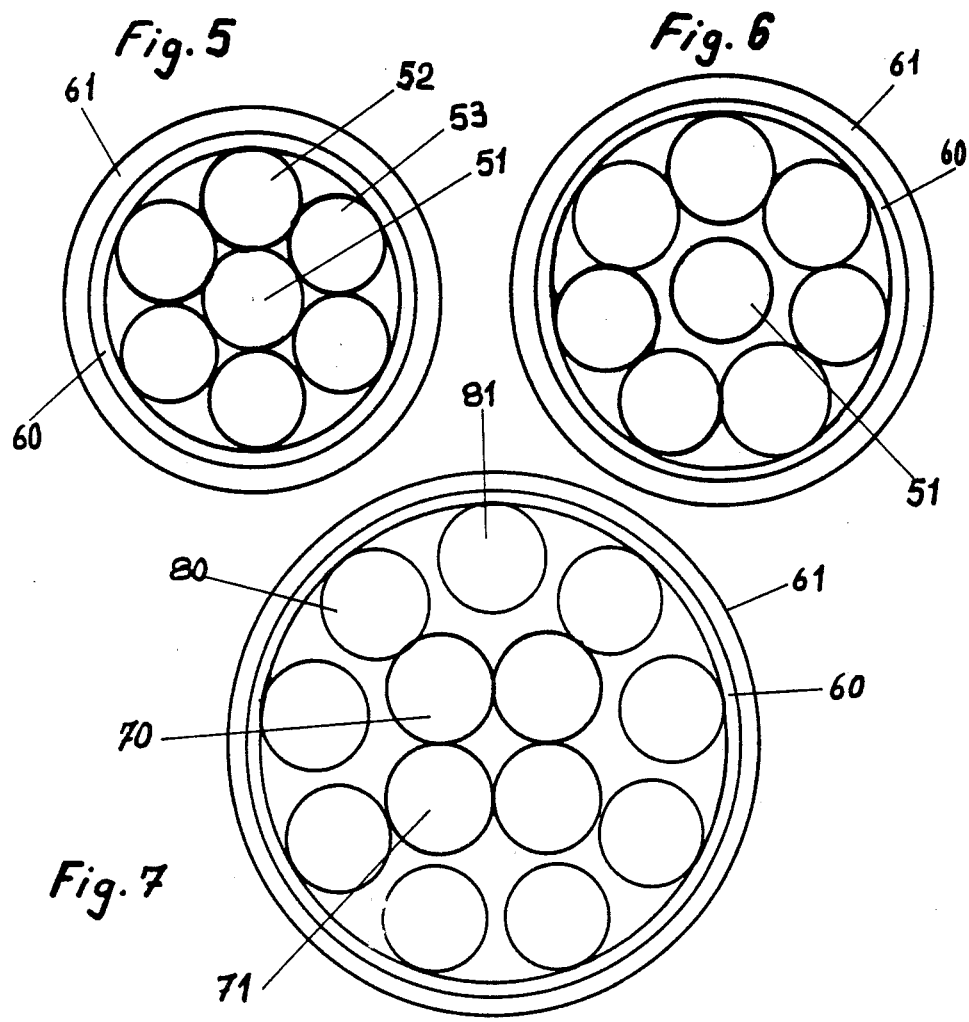

CABLE ELEMENTS COMPRISING OPTICAL FIBRES AND CABLES INCORPORATING THEM

BACKGROUND OF THE INVENTION

The present invention concerns communication cables using optical fibres to convey information in a very wide frequency band. The use of optical fibres as guides to propagate optical wave modulated by the information to be transmitted is tending to increase and, although it is curbed by the cost of the fibres themselves, it is reasonable to expect that industrial progress to occur in the next few years will permit such reduction in the cost of the fibres that the cables with optical waveguide will be competitive with copper high capacity and high quality cables.

The use of optical fibres presents new problems to cable manufacturers owing to the fragility of the fibres and the sensitivity of their transmission characteristics to mechanical stresses.

The present invention relates to a cable element structure comprising optical fibres which can be cabled by standard cable making machines currently used for standard cables. Such a structure shows the economical interest of manufacturing optical fibre cables with available cable making machinery without further investment.

United States Patent application Ser. No. 877,872 filed on Feb. 15, 1978 for: "Cable incorporating optical fibres" discloses a cable element which comprises a core consisting of one or more wires of mechanically rigid material, of which the elongation is greater than that of the material of the optical fibre and on which dielectric is extruded. The surface is formed with a set of helical grooves for lodging optical fibres and the outward opening of the grooves is at least partially closed by lips so as to prevent the dislodgement of the fibre and to protect it from any contact during subsequent cable making steps. The present invention is applicable to such an element and also to simplified grooved structures without lips.

BRIEF SUMMARY OF THE INVENTION

The present invention is characterized in that the optical fibre is subjected to a twist of between 3 and 10 turns per meter length at the moment when it is laid in the groove, the profile of which is made such that the flanks have a finite radius of curvature, at least over a fraction of their length, so that any peripheral stress exerted on the cabling element tends to move the fibre away from the bottom of the groove.

These two features of the cable elements according to the invention allow introducing in each groove a length of fibre which is larger than the developed length of the groove at its bottom. So the fibre forms undulations between the two flanks of the groove whereby the lateral surface of contact is reduced to discontinuous zones. Reducing the contacts between the groove walls and the fibre limits mechanical coupling between the core and the fibres so that the cable element can bear mechanical stresses on the core which would otherwise spoil the electrical characteristics of the fibre. As an example, this extra length makes it possible to exert on the cable element a pull which will not be passed on to the fibre, so that it is possible inter alia to reduce the diameter of the reels serving for the storage of the said elements. Furthermore cable elements according to the invention also have the advantage of laying a maximum number of fibres unto a core of given dimension and more particularly of dimensions giving completed cables whose diameters are compatible with those of already standardized ducts in the case of underground laying.

SHORT DESCRIPTION OF THE DRAWINGS

The invention will be readily understood from the following description and by reference to the accompanying figures which are given by way of non limiting example and in which:

FIG. 1 is a radial sectional view, drawn to a large scale, of the core and of the insulating covering formed with the grooves, in order to show the profile of a groove, FIG. 2 is an overhead view showing the position of a fibre in a groove, FIG. 3 is a synoptic diagram of a production line for such a cable element, FIG. 4 is a sectional view of a cable element, FIGS. 5, 6 and 7 are sectional views of optical fibre cables produced from the element of FIG. 4, and FIG. 8 is a sectional view of a complex cable structure.

DETAILED DESCRIPTION OF THE INVENTION

Figure 1:
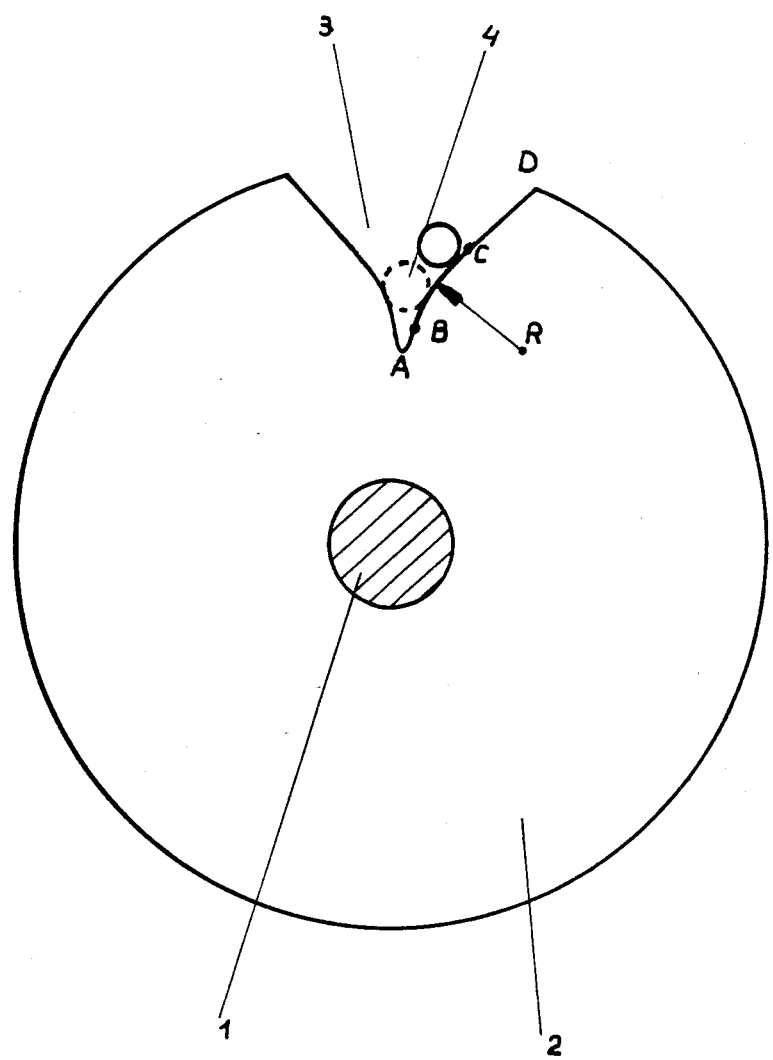

There is shown at 1 in FIG. 1 the mechanical core of a cable element according to the invention. The said core may consist of one or more steel wires of the piano-cord type or of organic fibres. Extruded around the said core is a sheath 2 consisting of medium density polyethylene which is formed with a given number, for example eight, of grooves such as 3 which extend in the form of parallel helices in the surface of the sheath 2. The said grooves may be directly obtained in the course of the extrusion of 2 or subsequently by machining of a cylindrical structure, for example as described in the U.S. Pat. No. 4,221,513, issued Sept. 9, 1980.

As is apparent, the profile of the V-shaped grooves which is symmetrical about a radius of the structure, has flanks of which a fraction BC is curved, as illustrated by the radius of curvature R. In an example of the form of grooves having a depth of 400 to 600 μm, the value of R is about 1 mm. The curvature of the flanks decreases the surface of contact between the fibre 4 and the sheath 2 if the fibre is prevented from falling at the bottom of the groove as shown in interrupted line where it is in contact with both flanks. The actual position of the fibre is shown in full line and the contact is limited to one flank of the groove and there is plenty of room for undulation to cope for extra-length.

Now the curved profile of the groove flanks results in a resultant centrifugal radial thrust on the fibre 4 due to any radial stress exerted on the cable element. Such stresses develop during the taping which follows the laying of the fibres for closing the grooves and in subsequent extrusions of protective sheathings. Experience has shown that it is preferable for the aperture of the V (angle at the bottom) to be in the neighbourhood of or less than 60 degrees. Likewise, in the case of elements taped in line with the laying of the optical fibres, good results are obtained if the V has a depth equal to about five times the diameter of the fibre. Experience has shown that with such a profile, at cutting the cable the fibre will protrude by a few centimeters on each side of the cut.

Figure 2:
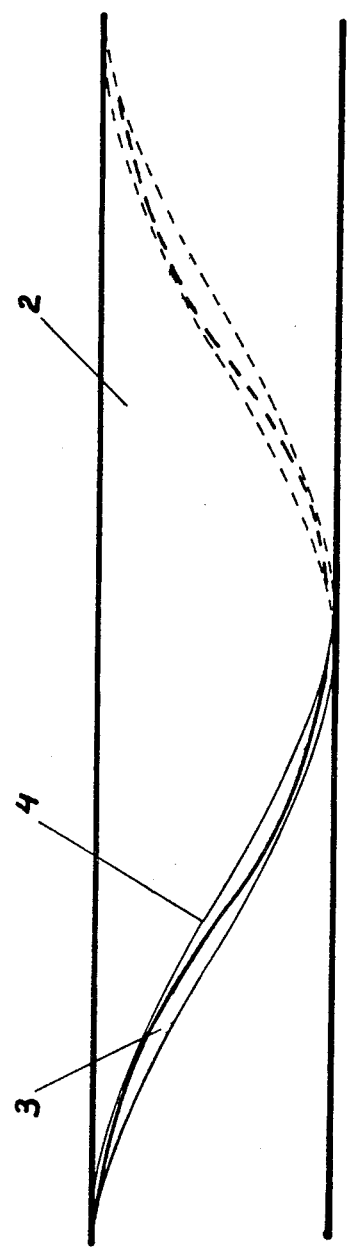

FIG. 2 is an overhead view of the incomplete cable element shown in section in FIG. 1, taping removed. The core sheathing 2 is formed with a helical groove 3 in which a fibre 4 is positioned. The length of the fibre 4 is greater than the length of the helix constituting the groove 3, so that the fibre oscillates from one flank of the groove to the other without reaching the bottom of the latter. The limit position of the fibre at the base of the groove is shown by a chain line in FIG. 1. It will be very clearly seen in this figure that the surface of contact between the fibre and the core is thus divided by a factor greater than two which is favourable to the reduction of the losses in the fibre. This type of lay of the fibre is obtained, for example, in a line as illustrated in FIG. 3.

Reel 10 is a rotating feed for the previously machined sheathed core 2. Machining of the core could be carried out in line at a working station disposed between the pay-off 10 of a smooth length of material and the plate 11 carrying the optical fibre pay-off reels such as 12. The plate is stationary. The reels 12 are actuated with a rotational movement perpendicular to their axis, as indicated by the arrows, so as to ensure that the fibre is twisted just before its laying into the groove. Guide 13 centres the core 2 in relation to the laying head 14. This head is, for example, of the type described in the French Patent Application filed on Mar. 1st, 1978, for: "Perfectionnements à la fabrication d'éléments de câblage comportant des fibres optiques" and registered as 78 05833. The angular position of reel 12 is centered by a sensor (not shown) and controlled through lead 15 and actuator 16. Two taping heads 17 and 18 position the tapes around the structure which is driven by a rotating puller 19 and stored on the rotating take-up reel 20.

The cable element may also be manufactured by rotating the plate 11 about the driven fibre core. In this case, should the axis of the reels be stationary in relation to the plate, the fibre receives a twist of one turn per revolution of the plate 11, which corresponds to one pitch of the helix of the grooves 3. In some cases, this twist is sufficient and the laying on a longitudinally driven core may be preferred to the laying on a rotating core, by reason of simplicity. The tension on the reels 12 must be carefully limited so as to prevent any unbalance and above all to permit the twisting of the optical fibres. In practice, a tension of the fibres maintained at a value below 50 g gives good results.

FIG. 4 is a sectional view of a cable element as obtained at the delivery end of the production line illustrated in FIG. 3. There will be seen at 1 the mechanical central core surrounded by the dielectric sheath 2 having helical grooves 3 in which the optical fibres 4 are disposed. The two tapings are shown at 21 and 22 respectively. The representation has deliberately been limited to one groove 3 and to a rough sketch of the other three grooves, the number of which depends upon the type of cable to be manufactured. In order to help identification of the fibres 4 on the core, two locating marks such as 23 and 24 are provided on different diameters of the latter. These locating marks may take the form of a slot made in the dielectric sheath either in the course of the extrusion or in the course of the machining for the formation of the helical grooves. In other variants, these locating marks take the form of patterns imprinted on the surface of the dielectric sheath.

FIGS. 5, 6 and 7 illustrate cables obtained by assembly of elements of the type illustrated in FIG. 4. The variant illustrated in FIG. 5 comprises a central element 51 surrounded by a layer of six elements 52, 53, etc. . . . and corresponds, as is known, to the best coefficient of packing per unit volume of an envelope of given diameter. This envelope is represented by a sheathing 60, for example of metal, which is protected in the well-known manner.

The particular arrangement of the optical fibres at the periphery of the support structure gives results relative to the maximum number of transmission elements that can be used in a structure of given diameter, which differ from the results obtained when transmission is along metal wires. An additional variable consisting of the number of optical fibres on each core of given diameter is available and more precisely the ratio between the diameter of the core and the number of grooves for the housing of an optical fibre. A study of the total coefficient of packing, that is to say, the total number of optical fibres that can be lodged in an envelope of given diameter, has given the following result, which shows that the structure made of a central element associated with seven peripheral elements distributed in a layer, the said structure being illustrated in FIG. 6, gives a better packing coefficient per unit volume than the structure of FIG. 5.

This result can be borne out by the following explanation. It will be assumed that it is preferable to use structures having an even number of fibres in order to simplify the problem of two-way communication. The packing coefficient a of an element is given by $$a = 2 \frac{E\left(\frac{2\pi R}{2l}\right)}{\pi R^2}.$$

where
E(x) = the integer part of x
R is the radius of the fibre support
l is the minimum arc occupied by a groove (i.e. the width of the groove at the periphery plus an interval between the grooves).

The external diameter of the cable is set. By way of example, a value between 13.5 and 14 mm was chosen in order to reach a diameter of about 15 mm after the application of the sheathing, this corresponding to a value standardized by the Post Office authorities with a view to obtaining the best occupation of the standardized ducts. Calculation justifies the use of a core having a diameter of 3.2 mm carrying ten fibres and the stranding 1+7 illustrated in FIG. 6. The mechanical tolerances corresponding to such a structure are compatible with the known machining methods, for example those described by the Applicants in the United States Patent application Ser. No. 919,268 filed on June 26, 1978, for: "Extrusion tool" (now U.S. Pat. No. 4,163,641) and in the French Patent Application filed on January 4, 1978, for: "Procédé d'usinage en continu de support pour guides d'ondes électromagnétiques". The minimum value of R is fixed by the precision of the machining of the grooves (value of l and depth of the grooves) as also the diameter of the core and the necessity to retain between the bottom of the grooves and the core a certain thickness of dielectric coating. In a particular cable construction according to the invention, the diameter at the base of the grooves is maintained equal to twice the diameter of the core.

FIG. 7 illustrates a modified form of cable comprising two concentric layers of cabling elements, a first central layer of four elements and an external layer of nine elements.

Figure 8:
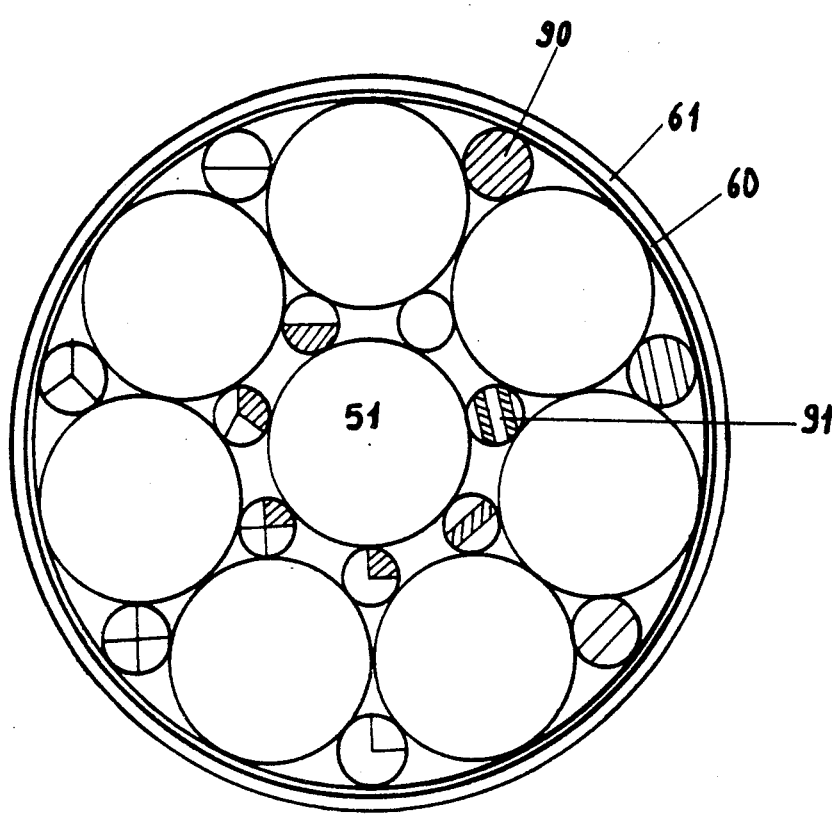

FIG. 8 illustrates to a larger scale a variant of the construction according to FIG. 6 showing the possibility of using the voids between optical fibre cable elements for lodging therein conventional metal wires, such as elements consisting of pairs, quads, 90, 91, etc. . . ., which serve for the transmission of service signals and/or for remote supply of repeaters. In such a structure, the colouring of the auxiliary elements may be used for identification of the cable elements constituting the cable. It is therefore unnecessary to provide marking means other than those already mentioned with reference to FIG. 4. Experience has shown that the cabling of the optical fibre elements necessitates applying thereto a twist in a range of values corresponding to that used in the laying of the optical fibres in the grooves. Of course, the nature of the protecting envelopes 60 and 61 surrounding the cable depends essentially upon the use of the latter. In some cases, it may be preferred to tape at least one of the tapings 17, 18 with an asbestos treated tape, more particularly for the elements constituting the external layer of the cable. The asbestos treated tape is preferably applied to the assembled cable before the external envelope is applied thereto. The operation of assembling the cable elements according to the invention is carried out by means of conventional back twist cable making machines which are so adjusted as to produce a back-twist greater than that serving to compensate for the assembly lay and comprising convergent cradles for the purpose of limiting the forces exerted on the cable elements in the course of the assembling operation.

In the foregoing, there have been described cables in which the auxiliary signals (remote feeding, signalling, telemetering signals, etc. . . . ) are transmitted by means of conventional wires arranged in pairs, quads, etc. . . . It is to be understood that within the scope of the present invention some or all of these signals may be transmitted by the wires of the core, which will necessitate making them at least partially from insulated metallic wires, generally of copper instead of steel.

What we claim:

1. An optical fibre cable element comprising a mechanical core; a cylindrical sheath surrounding the core and containing helical grooves of V-shape in cross section in its surface, each groove being bounded by a pair of flanks which are curved convexly toward the interior of the groove over only portions of their lengths; a single undulating optical fibre in each groove resting alternately on the curved portions of the flanks and held thereby spaced from the bottom of the groove; and at least one taping around the sheath.

2. A cable element as defined in claim 1 in which each fibre is laid in its groove in a twisted condition.

3. A cable element as defined in claim 1 in which the angle between the flanks at the apex of each groove is not greater than 60 degrees.

4. A cable element as defined in claim 1 in which the depth of the grooves is between three and five times the diameter of the fibres.

5. A cable element as defined in claim 1 in which the sheath includes a pair of notches which are located on different diameters and serve to mark the locations of the fibres.

* * * * *